United States Patent
Ben-Ezra et al.

(10) Patent No.: US 9,832,153 B2
(45) Date of Patent: *Nov. 28, 2017

(54) ELIMINATING REDUNDANT NOTIFICATIONS TO SIP/SIMPLE SUBSCRIBERS

(71) Applicant: INTERNATIONAL BUSINESS MACHINES CORPORATION, Armonk, NY (US)

(72) Inventors: Asaf Ben-Ezra, Acco (IL); Olga Berezin, Yokneam Ilit (IL); Haim Schneider, Ramot Meir (IL); Ofira Tal-Aviv, Moshav Bitzaron (IL); Asaf Zinger, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/734,650

(22) Filed: Jun. 9, 2015

(65) Prior Publication Data

US 2015/0271123 A1 Sep. 24, 2015

Related U.S. Application Data

(63) Continuation of application No. 11/972,650, filed on Jan. 11, 2008, now Pat. No. 9,088,578.

(51) Int. Cl.
*H04L 12/58* (2006.01)
*H04L 29/06* (2006.01)
(Continued)

(52) U.S. Cl.
CPC ............. *H04L 51/24* (2013.01); *H04L 41/50* (2013.01); *H04L 51/043* (2013.01); *H04L 65/1006* (2013.01); *H04L 67/24* (2013.01)

(58) Field of Classification Search
CPC ... H04L 12/5815; H04L 41/50; H04L 51/043; H04L 51/24
(Continued)

(56) References Cited

U.S. PATENT DOCUMENTS

| | | | |
|---|---|---|---|
| 6,185,613 B1 * | 2/2001 | Lawson | G06F 9/542 709/224 |
| 6,549,957 B1 * | 4/2003 | Hanson | G06Q 10/107 709/206 |

(Continued)

OTHER PUBLICATIONS

A. B. Roach; "Session Initiattion Protocol (SIP)—Specific Event Notification"; RFC 3265—Standards. Network Working Group. SIP—Specific Event Notification; Jun. 2002; pp. 1-38; http://www.ietf.org/rfc/rfc3265.txt?number=3265.

(Continued)

*Primary Examiner* — Khaled Kassim
*Assistant Examiner* — Saad A Waqas
(74) *Attorney, Agent, or Firm* — Sughrue Mion, PLLC

(57) ABSTRACT

A system for eliminating redundant notifications to SIP/SIMPLE subscribers, the system including a notification fingerprinter configured to generate a fingerprint from the contents of a SIP/SIMPLE subscriber notification using a predefined fingerprinting method, a fingerprint comparator configured to compare a fingerprint of a previously-sent notification with a fingerprint of a waiting-to-be-sent notification, and a server configured to send the waiting-to-be-sent notification to the subscriber only if the fingerprints do not match.

15 Claims, 3 Drawing Sheets

(51) Int. Cl.
  *H04L 29/08* (2006.01)
  *H04L 12/24* (2006.01)
(58) Field of Classification Search
  USPC .......................................................... 709/225
  See application file for complete search history.

(56) References Cited

U.S. PATENT DOCUMENTS

| | | | |
|---|---|---|---|
| 7,080,123 | B2 | 7/2006 | Freed |
| 7,149,778 | B1* | 12/2006 | Patel ..................... H04L 12/585 709/206 |
| 2004/0059933 | A1* | 3/2004 | Levy ........................ G06F 21/10 726/31 |
| 2005/0060643 | A1 | 3/2005 | Glass et al. |
| 2006/0031346 | A1 | 2/2006 | Zheng et al. |
| 2007/0121596 | A1* | 5/2007 | Kurapati .......... H04L 29/06027 370/356 |
| 2007/0234428 | A1* | 10/2007 | Rash .................... G06F 21/552 726/25 |
| 2008/0212846 | A1* | 9/2008 | Yamamoto ............... G06K 9/68 382/115 |
| 2008/0270373 | A1* | 10/2008 | Oostveen .......... G06F 17/30825 |
| 2008/0282303 | A1* | 11/2008 | Harkness ................ H04H 20/14 725/113 |
| 2008/0307513 | A1* | 12/2008 | Chow ................... H04L 12/581 726/5 |
| 2009/0013193 | A1* | 1/2009 | Matsuzaki ............ H04L 9/0891 713/189 |
| 2011/0072077 | A1* | 3/2011 | Tomkow ............. H04L 12/5875 709/203 |
| 2011/0134898 | A1* | 6/2011 | Robertson .......... H04L 63/0428 370/338 |

OTHER PUBLICATIONS

H. Schulzrinne et al.; "Common Policy: A Document Format for Expressing Privacy Preferences"; RFC 4745—Standards. Network Working Group. Common Policy.; Feb. 2007; pp. 1-32; http://www.ietf.org/rfc/rfc4745.txt?number=4745.

H. Khartabil, et al.; "Functional Description of Event Notification Filtering"; RFC 4660—Standards. Network Working Group. Functional Description of Filtering.; Sep. 2006; pp. 1-31; http://www.ietf.org/rfc/rfc4660.txt?number=4660.

* cited by examiner

ELIMINATING REDUNDANT NOTIFICATIONS TO SIP/SIMPLE SUBSCRIBERS

CROSS-REFERENCE TO RELATED APPLICATIONS

The present application is a continuation of Application Ser. No. 11/972,650 filed Jan. 11, 2008, the disclosure of which is hereby incorporated by reference.

FIELD OF THE INVENTION

The present invention relates to computer networks in general, and more particularly to providing information to networked entities regarding the status of other networked entities.

BACKGROUND OF THE INVENTION

The Session Initiation Protocol (SIP) is a protocol for creating, modifying, and terminating computer network-based communication sessions, such as for an Internet-based telephone call between two or more participants. Since its introduction various enhancements to SIP have been proposed, including the SIP Instant Messaging and Presence Leveraging Extensions (SIMPLE) framework in which one or more network entities, such as computer users, create subscriptions on a server, known as a "presence" server, to receive presence information regarding another network entity, referred to as a "presentity." When a change in the presentity's presence information is detected, such as when the presentity "publishes" such a change to the presence server, SIP is used to send a notification to the subscribers including the presentity's current presence information.

Further enhancements to SIP/SIMPLE include enabling presentities to limit what presence information subscribers may receive in a notification, as well as enabling subscribers to limit what available presence information they wish to receive in a notification. For example, presentity Joe's presence information includes elements ABCDE, while Joe limits subscriber Bob to receive only elements BCDE. If a change occurs to any of elements ABCDE, the presence server managing Bob's subscription will send Joe a notification including elements BCDE. However, if the change is to element A, and Bob previously received a notification including elements BCDE, Bob will receive no new information in the notification, as Bob previously received elements BCDE and does not in any case receive element A. Similarly, if Bob is only interested in elements DE, and sets a notification filter accordingly, if the change is to any of elements ABC, and Bob previously received a notification including elements DE, Bob will receive no new information in the notification, as Bob only ever receives elements DE. In both these examples, the changes to Joe's presence information caused redundant notifications to be sent to Bob, needlessly consuming processing and bandwidth resources.

Systems and/or methods for eliminating redundant notifications to SIP/SIMPLE subscribers would therefore be advantageous.

SUMMARY OF THE INVENTION

The present invention in embodiments thereof discloses novel systems and methods for eliminating redundant notifications to SIP/SIMPLE subscribers.

In one aspect of the present invention a system is provided for eliminating redundant notifications to SIP/SIMPLE subscribers, the system including a notification fingerprinter configured to generate a fingerprint from the contents of a SIP/SIMPLE subscriber notification using a predefined fingerprinting method, a fingerprint comparator configured to compare a fingerprint of a previously-sent notification with a fingerprint of a waiting-to-be-sent notification, and a server configured to send the waiting-to-be-sent notification to the subscriber only if the fingerprints do not match.

BRIEF DESCRIPTION OF THE DRAWINGS

The present invention in embodiments thereof will be understood and appreciated more fully from the following detailed description taken in conjunction with the appended drawings in which.

DETAILED DESCRIPTION OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1A:
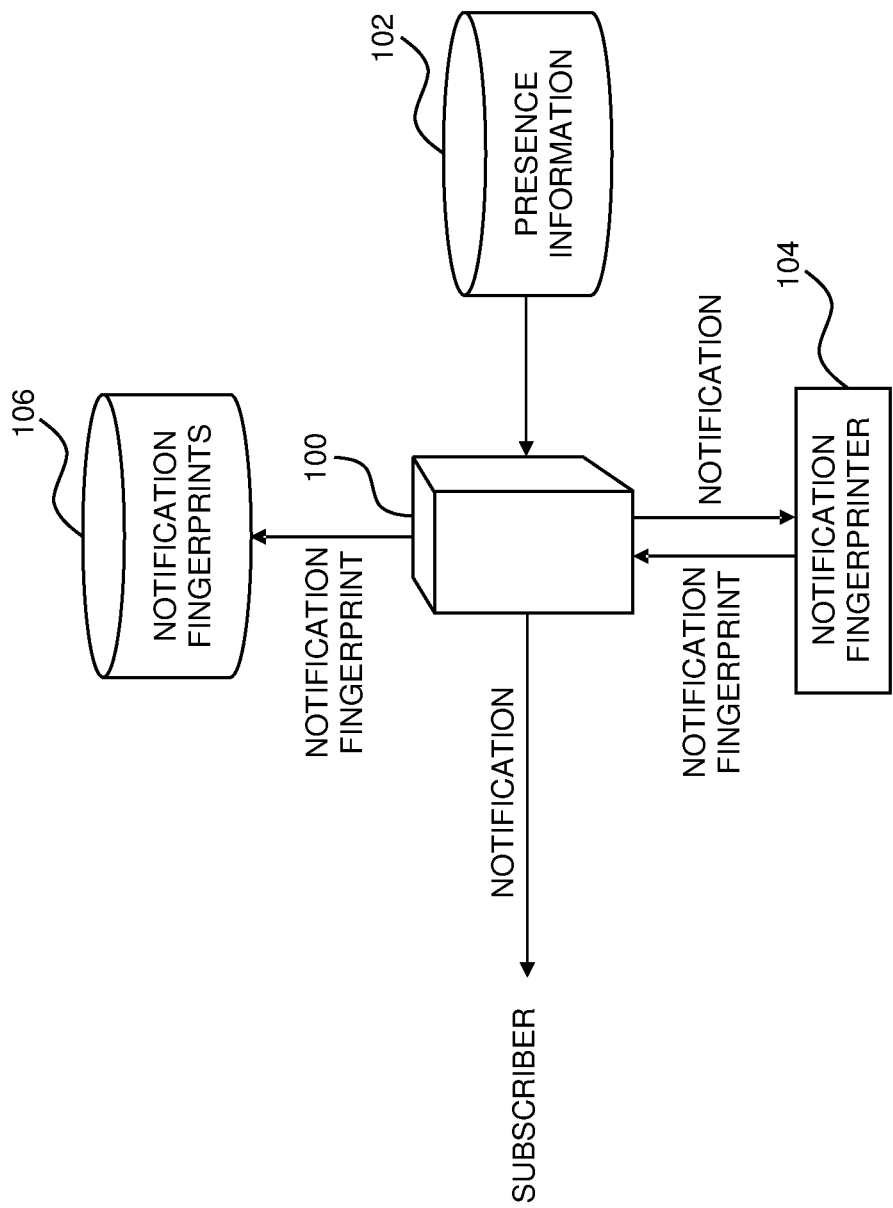
FIG. 1A is a simplified illustration of a system for eliminating redundant notifications to SIP/SIMPLE subscribers, constructed and operative in accordance with an embodiment of the present invention.

Reference is now made to FIG. 1A, which is a simplified illustration of a system for eliminating redundant notifications to SIP/SIMPLE subscribers, constructed and operative in accordance with an embodiment of the present invention. In the system of FIG. 1A, a server 100, such as a computer running a SIP/SIMPLE presence server, sends a notification to a subscriber for a presentity's presence information 102. The notification is typically sent in response to server 100 receiving a request to create, renew, or cancel the subscription, or when there is a change in the presence information of the presentity as such information is known to server 100.

Server 100 typically includes, or has access to, a notification fingerprinter 104 which generates a fingerprint from the contents of the notification using a predefined fingerprinting method. The fingerprint is generated using any conventional technique, such as by creating a hash value from the notification in accordance with a predefined hash algorithm. The fingerprint is preferably generated such that the probability that two different notifications will have the same fingerprint is below a predefined threshold. One fingerprint may be generated for the entire notification, or alternatively the notification may be split into multiple segments, with a separate fingerprint being created separately for each segment, and an overall fingerprint being formed from the separate fingerprints. The fingerprint is preferably stored in a data store 106, which may be any computer-readable storage medium, together with an identifier of the subscriber to which the notification is sent, such as a network address, and/or the subscription, such as the SIP session ID of the subscription for which the notification is sent.

Figure 1B:
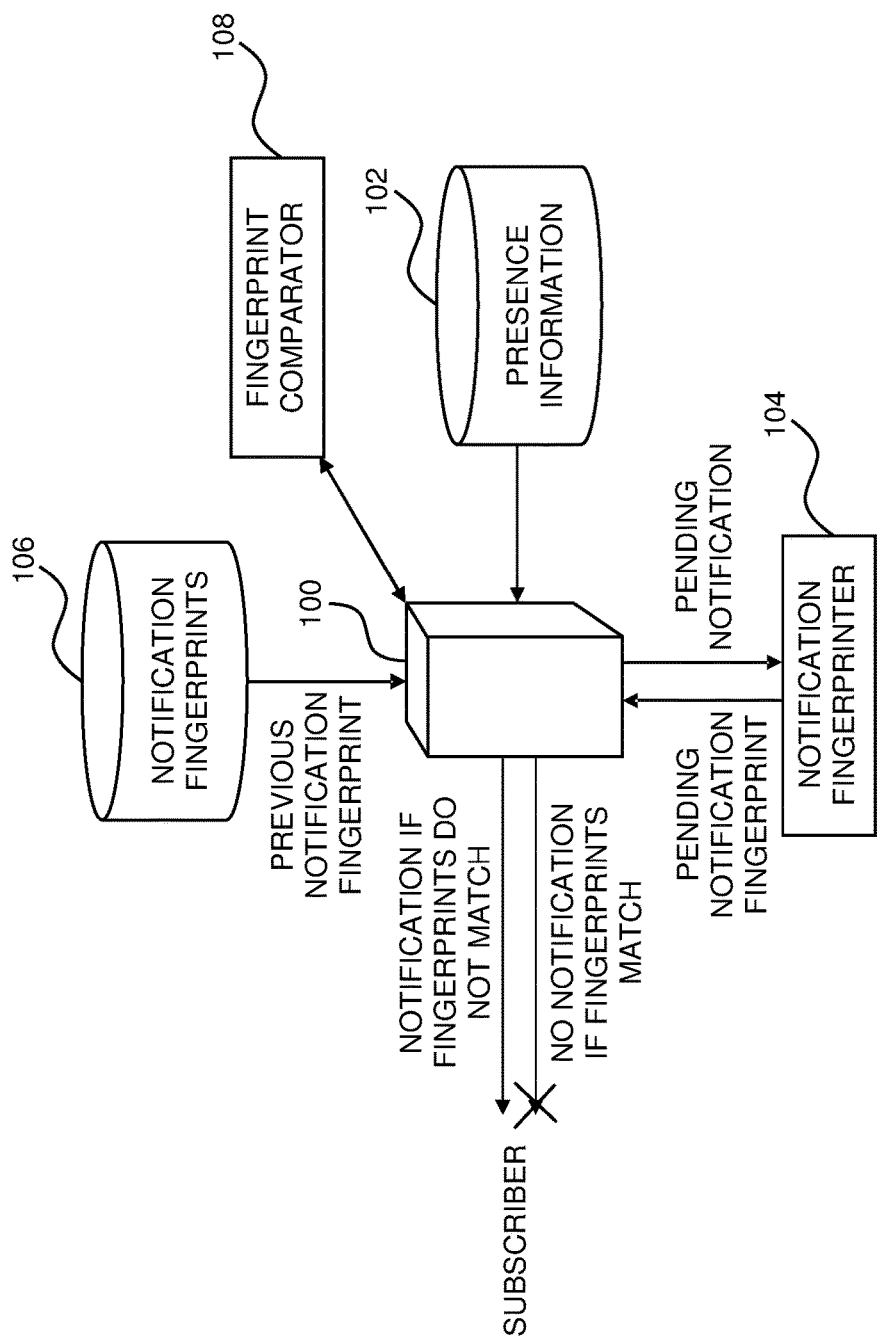
FIG. 1B is a simplified illustration of a system for eliminating redundant notifications to SIP/SIMPLE subscribers, constructed and operative in accordance with an embodiment of the present invention.

Reference is now made to FIG. 1B, which, is a simplified illustration of a system for eliminating redundant notifications to SIP/SIMPLE subscribers, constructed and operative in accordance with an embodiment of the present invention. In the system of FIG. 1B, prior to sending a notification to a subscriber, notification fingerprinter 104 preferably generates a fingerprint from the contents of the notification using the predefined fingerprinting method. Server 100 then retrieves the fingerprint from data store 106 of the notification last sent to the subscriber. Server 100 typically includes, or has access to, a fingerprint comparator 108 which compares the stored fingerprint with the fingerprint generated for the notification waiting to be sent to the subscriber. If the fingerprints match, the notification waiting to be sent may be considered to be a duplicate of the notification last sent to the subscriber, whereupon server 100 preferably does not send the notification to the subscriber. If the fingerprints do not match, the notification waiting to be sent is not the same as the notification last sent to the subscriber, whereupon server 100 sends the notification to the subscriber, and replaces the fingerprint of the previous notification with the fingerprint of the currently sent notification.

Figure 2:
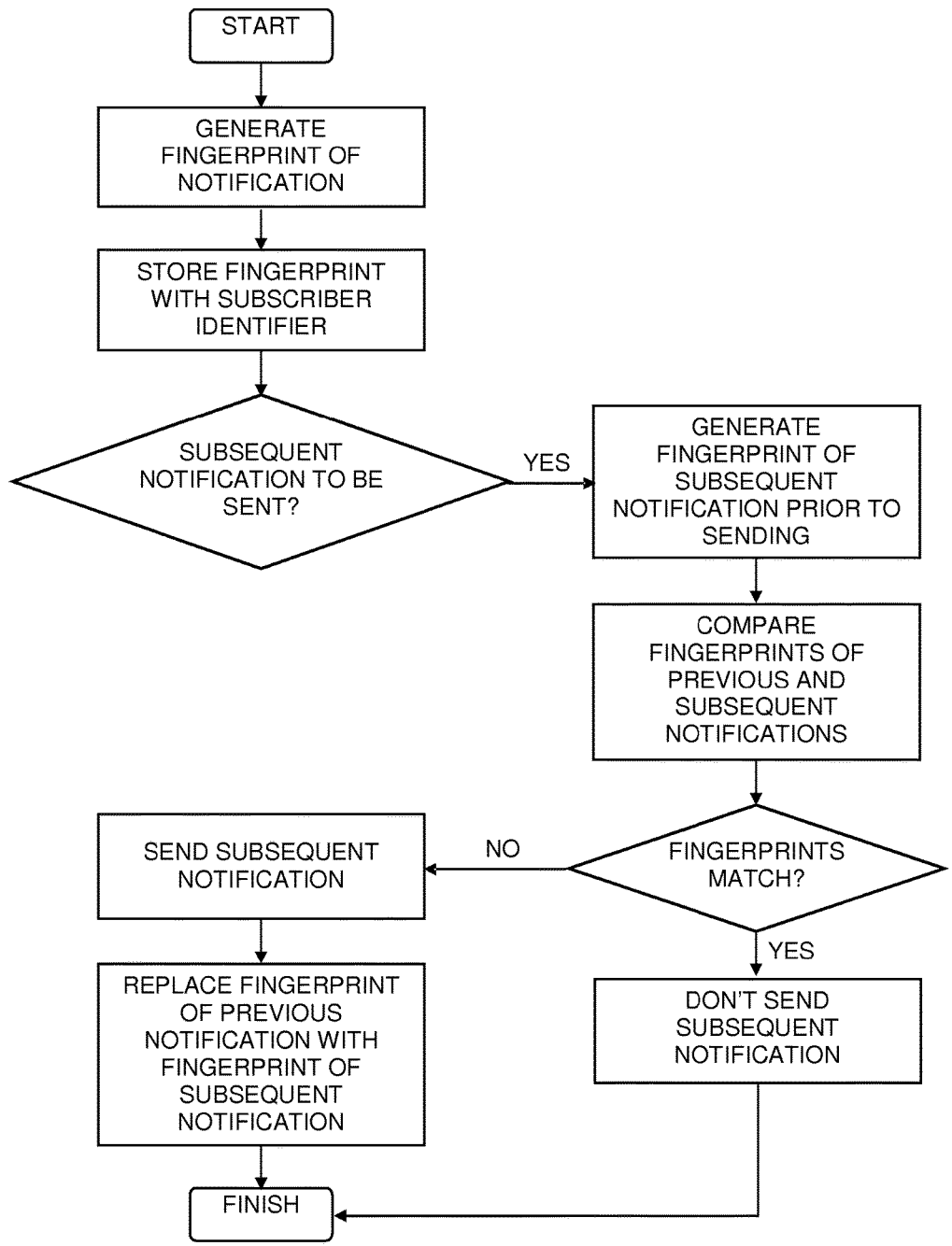
FIG. 2 is a simplified flowchart illustration of an exemplary method of operation of the system of FIGS. 1A and 1B, operative in accordance with an embodiment of the invention.

Reference is now made to FIG. 2, which is a simplified flowchart illustration of an exemplary method of operation of the system of FIGS. 1A and 1B, operative in accordance with an embodiment of the invention. In the method of FIG. 2, when a notification is sent, such to a subscriber for presence information in a SIP/SIMPLE system, a fingerprint is generated from the contents of the notification as described above, and the fingerprint is stored together with an identifier of the subscriber to which the notification is sent. Prior to sending a subsequent notification to the subscriber, a fingerprint is generated from the contents of the notification using same fingerprinting method as before. The stored fingerprint of the previous notification and the fingerprint of the subsequent notification are then compared. If the fingerprints match, the subsequent notification is not sent to the subscriber. If the fingerprints do not match, the subsequent notification is sent to the subscriber, and the fingerprint of the previous notification is replaced with the fingerprint of the currently sent notification.

Any of the elements shown in FIGS. 1A and 1B and method steps shown in FIG. 2 are preferably implemented in computer hardware and/or in computer software embodied in a computer-readable medium.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for eliminating redundant notifications to subscribers, the system comprising:
   a notification fingerprinter configured to generate a fingerprint from contents of a subscriber notification using a predefined fingerprinting method;
   a fingerprint comparator configured to compare a fingerprint of a previously-sent notification with a fingerprint of a waiting-to-be-sent notification; and
   a server configured to determine to omit sending said waiting-to-be-sent notification to an email account of a subscriber in response to the comparing by said fingerprint comparator yielding that said fingerprint of said waiting-to-be-sent notification and said fingerprint of said previously-sent notification match,
   wherein, in response to determining that said fingerprint of said waiting-to-be-sent notification and said fingerprint of said previously-sent notification do not match, the server sends said waiting-to-be-sent notification to the email account of said subscriber and replaces said fingerprint of said previously-sent notification with a fingerprint of a currently sent notification, and
   wherein, said previously-sent notification and said waiting-to-be sent notification comprise an update to presence information of SIP/SIMPLE subscribers.

2. The system according to claim 1, wherein any of said fingerprinter, said comparator, and said server are implemented in either of: a) computer hardware and b) computer software embodied in the non-transitory computer-readable medium.

3. The system according to claim 1, wherein said notification fingerprinter is further configured to create a hash value from any of said notifications in accordance with a predefined hash algorithm.

4. The system according to claim 1, wherein said notification fingerprinter is further configured to create said fingerprint wherein the probability that two different notifications will have the same fingerprint is below a predefined threshold.

5. The system according to claim 1, wherein said notifications are SIP/SIMPLE notifications.

6. The system according to claim 1, wherein, in response to said comparison yielding that said fingerprint of said waiting-to-be-sent notification matches with said fingerprint of said previously-sent notification, the server determines that the said waiting-to-be-sent notification is a duplicate of said previously-sent notification and discards said waiting-to-be-sent notification.

7. The system according to claim 1, wherein, in response to the server determining to omit to send said waiting-to-be sent notification, the said waiting-to-be sent notification is discarded.

8. The system according to claim 1, wherein said previously-sent notification is a most recently sent notification to the subscriber with respect to a presentity providing the contents.

9. A method for eliminating redundant notifications to subscribers, the method comprising:
   generating a fingerprint from contents of a first subscriber notification using a predefined fingerprinting method;
   sending said first notification to a subscriber;
   generating a fingerprint from the contents of a subsequent subscriber notification using said predefined fingerprinting method;
   comparing said fingerprints;
   determining to omit to send said subsequent notification to an email account of said subscriber in response to the result of said comparison yielding that said fingerprint of said subsequent notification matches with said fingerprint of said first notification; and
   sending said subsequent notification to the email account of said subscriber and replacing said fingerprint of said first notification with a fingerprint of a currently sent notification in response to the result of said comparison yielding that said fingerprint of said subsequent notification does not match with said fingerprint of said first notification, wherein, said first notification and said subsequent notification comprise an update to presence information of SIP/SIMPLE subscribers.

10. The method according to claim 9, further comprising creating a hash value from any of said notifications in accordance with a predefined hash algorithm.

11. The method according to claim 9, further comprising creating said fingerprint wherein the probability that two different notifications will have the same fingerprint is below a predefined threshold.

12. The method according to claim 9, wherein said notifications are SIP/SIMPLE notifications.

13. The method according to claim 9, wherein, in response to said comparison yielding that said fingerprint of said subsequent notification matches with said fingerprint of said first notification, determining that the said subsequent notification is a duplicate of said first notification and discarding said subsequent notification.

14. The method according to claim 9, wherein, in response to the determining to omit to send said subsequent notification, said subsequent notification is discarded.

15. A non-transitory computer-readable storage medium comprising instructions for enabling a computer to execute a method for eliminating redundant notifications to subscribers, the method comprising:

generating a fingerprint from contents of a first subscriber notification using a predefined fingerprinting method;

sending said first notification to said subscriber;

generating a fingerprint from the contents of a subsequent subscriber notification using said predefined fingerprinting method;

comparing said fingerprints;

determining to omit sending said subsequent notification to an email account of said subscriber in response to the comparing yielding that said fingerprint of said subsequent notification matches with said fingerprint of said first notification; and sending said subsequent notification to the email account of said subscriber and replacing said fingerprint of said first notification with a fingerprint of a currently sent notification in response to the comparing yielding that said fingerprint of said subsequent notification does not match with said fingerprint of said first notification, wherein, said first notification and said subsequent notification comprise an update to presence information of SIP/SIMPLE subscribers.

* * * * *